July 15, 1947.  E. C. READ  2,424,190

STUFFING BOX

Original Filed Feb. 3, 1937

INVENTOR.
EVERETT C. READ
BY John W. Michael
ATTORNEY.

Patented July 15, 1947

2,424,190

UNITED STATES PATENT OFFICE 2,424,190

STUFFING BOX

Everett C. Read, Milwaukee, Wis., assignor to The Filer & Stowell Co., Milwaukee, Wis., a corporation of Wisconsin Application June 3, 1942, Serial No. 445,619, which is a division of application Serial No. 123,789, February 3, 1937, now Patent No. 2,300,747, dated November 3, 1942. Divided and this application April 1, 1943, Serial No. 481,438

2 Claims. (Cl. 308—36.1)

This invention relates in general to steam engines and more particularly to an improved stuffing box or packing gland construction employed in such engines for establishing a steam tight joint between the piston rod of the engine and the cylinder head through which the piston rod slides or reciprocates.

The present application is a division of my application for "Steam engines," filed June 3, 1942, Serial No. 445,619, which in turn is a division of my application filed February 3, 1937, Serial No. 123,789, for "Steam engines," now Patent No. 2,300,747, issued November 3, 1942.

In steam engines of the character indicated it is sometimes necessary to disassemble the piston and cylinder for the purpose of replacing or adjusting the packing rings on the piston or for other purposes. The stuffing boxes or glands that have heretofore been employed frequently include sectional packing rings, the adjustment and assembly of which, to establish the necessary steam tight joint between the piston rod and cylinder head, requires the expenditure of considerable time and skillful effort. When the pistons are disassembled from the cylinders, it has been necessary, with prior constructions, to dismantle the sectional packing embodied in the stuffing box of the gland. Then when the engine is re-assembled, the sectional packing must also be re-assembled and adjusted.

The present invention proposes to so constitute and organize a stuffing box or packing gland that it is applicable to and removable from its cylinder head as a unit. The construction is such as to permit the assembly and disassembly of the piston and cylinder without disturbing the assembly or adjustment of the packing.

In carrying out this purpose, the sectional packing rings and their springs or other associated parts are all contained within a packing housing. The follower, which coacts with the rings to adjust the packing, is adjustably interconnected with this housing. The housing, packing rings, and follower may be assembled with or disassembled from the cylinder head as a unit. When assembled with the cylinder head, the packing housing is releasably though securely attached thereto. This is accomplished by flanging one end of the packing housing and engaging such flanged end with a seat provided therefor on the cylinder head. The opposite end of the packing housing is threaded. A collar is provided for retaining the packing housing in seated position and has free running threaded engagement with the threaded end of the packing housing. Lock screws are threaded through the collar and coact with adjacent portions of the cylinder head to rigidly and securely fix the parts in properly assembled relation.

Other objects and advantages reside in certain novel features of the construction, arrangement, and combination of parts, which will be hereinafter more fully described and particularly pointed out in the appended claims, reference being had to the accompanying drawing forming a part of this specification, and in which:

Figure 1:
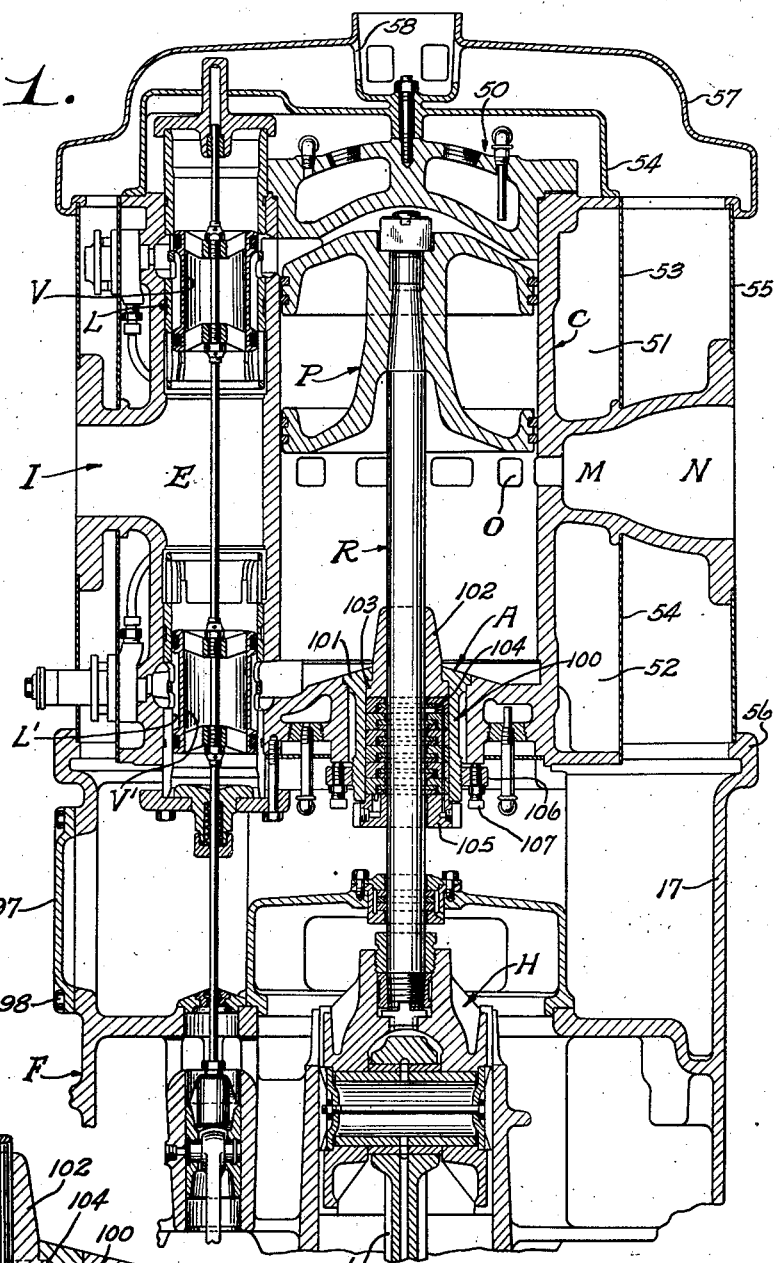
Figure 1 is a fragmentary view in central, vertical, longitudinal section, showing a steam engine having incorporated in its construction an improved stuffing box or packing gland embodying the present invention, parts being shown in elevation for the sake of simplicity in illustration.
Figure 2:
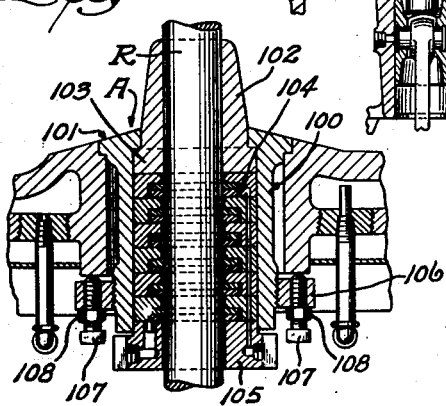
Figure 2 is a fragmentary sectional view on an enlarged scale showing the combined stuffing box and guide embodying the present invention and also illustrating a fragment of the lower end head of the cylinder and associated parts.

Referring to the drawing, it will be seen that the steam engine there illustrated is of the vertical, double-acting, reciprocating type, but, as will be understood by those skilled in the art, the novel features of the present invention are applicable to various other types.

The engine shown comprises generally a frame or crank casing F, only a portion of which is illustrated. A cylinder C is supported above the crank case. A piston P is reciprocable in the cylinder and has a piston rod R projecting down through a combined stuffing box and piston rod guide A embodying the present invention. Below the stuffing box and guide A the piston P is connected up to a cross head H and through the cross head operatively interconnects with a connecting rod, a portion of which is designated at C'. The details of these parts form no part of the present invention, and they are fully shown and described in my patent referred to above.

The cylinder C is provided with a steam inlet I which communicates with the center of a valve chest E. At the upper and lower ends of the valve chest E liners L and L' are provided. Upper and lower steam inlet valves V and V' are slidably fitted in the liners L and L' and respectively control the supply of steam to the upper and lower ends of the cylinder C. The steam is exhausted from the cylinder through the exhaust ports O under the control of the piston P. The exhaust ports O communicate with an exhaust manifold M which leads the exhaust N from the engine.

The outside of the cylinder C and its upper removable end head 50 are covered by layers of insulating material 51 and 52 enclosed in sheathing 53 and 54 of sheet metal. The sheathing 53 is surrounded by an outer casing 55 concentric with the center line of the cylinder C and in spaced relation with the outer surface thereof. The outer casing 55 is supported at its lower end on a flange 56, provided at the upper end of an extension 17 of the crank case. A cap or cover 57 is supported on the upper end of the casing 55 and is disposed in spaced relation to the sheathing 54. At the center of the cap 57 a baffled air discharge opening 58 is provided. The fitting which provides the baffle air discharge opening is suitably secured to the cap 57 and is bolted or otherwise releasably secured to the upper end head 50 of the cylinder. The details of this construction per se form no part of the present invention save for the fact that they indicate certain general features of the construction, namely the removability of the cap 57, the sheathing 54, and the upper end head 50 of the engine, such features bringing out the practical utility of the combined stuffing box and guide embodying the present invention.

The combined stuffing box and piston rod guide A, through which the piston rod R reciprocates, comprises a packing housing designated generally at 100 and preferably in the form of a cylindrical bushing. The upper end of the packing housing 100 is provided with an outwardly directed, annular, rabbeted flange 101. In the assembly, this flange 101 engages a similarly formed seat provided around the inner margin of the center opening of the lower end head of the cylinder C. The interengaging surfaces of the flange 101 and its seat are a ground fit to insure a hermetic seal in the assembly. Interfitted with the upper end of the bushing 100 is a sleeve-like piston rod guide 102. The guide 102 is provided at its lower end with an integral, outwardly directed, annular flange 103, which engages with an internal flange at the upper end of the bushing or housing 100. Sectional metallic packing 104 is provided and is entirely housed and combined with the bushing or housing 100. While this packing may be of any suitable type, usually it is, as indicated, metallic and sectional, and its segment or rings and springs, or other parts that go to make it up, must be carefully assembled and then properly compressed. In the present construction the uppermost element of the sectional metallic packing engages the lower end of the sleeve 102. A follower 105 engages the lowermost element of the sectional metallic packing, and is threadedly interconnected with the housing 100, or otherwise suitably adjustably interconnected therewith so that it may be turned or adjusted to hold the sectional metallic packing in proper position and subject it to the proper pressure.

The bushing or housing 100 projects downwardly beyond the lower end head of the cylinder and its lower projecting portion is externally threaded so as to be adapted to be threadedly engaged with an internally threaded collar 106. The collar 106 has a free running threaded engagement with the bushing so that the collar may be readily turned up on or backed up off the bushing. Lock screws 107, equipped with lock nuts 108, are threaded through the collar 106 and bear against the lower cylinder head to firmly secure the bushing or housing 100, packing 104, guide sleeve 102, and follower 105, as a unitary self-contained structure in proper position on the lower end head of the cylinder.

By loosening the lock nuts 108, and slightly backing off the lock screws 107, the collar 106 may be readily spun off the bushing to allow the bushing with its assembled packing 104, guide 102, and follower 105 to be pulled up through the cylinder C without dismantling the packing 104 or disturbing its adjustment. Of course, this disassembly of the structure requires the removal of the upper end head 50. With the collar 106 removed from the bushing, these parts, as will be seen from the drawing, will pass readily up through the opening in the lower end head. The fittings shown diagrammatically in the drawing, and associated with the follower 105, for lubricating and draining the metallic packing 104, are of course uncoupled.

It will be noted that the metallic packing 104 has its lower rings constituted to provide scrapers adapted to scrape off any moisture from the piston rod, and any such moisture is carried off by the draining fitting with which the follower of the stuffing box is equipped.

Access to the lock nuts 108, screws 107, and collar 106 and associated parts, is then had by removing one of the cover plates 97 releasaby secured by bolts 98 over openings or hand-holes provided opposite these removable parts in both the front and rear sides of the crank case.

While I have shown and described one construction in which the invention may be advantageously embodied, it is to be understood that the construction shown has been selected merely for the purpose of illustration or example, and that various changes in the size, shape, and arrangement of parts may be made without departing from the spirit of the invention or the scope of the subjoined claims.

I claim:

1. A combined self-contained stuffing box assembly and guide applicable to and removable from the opening of an end head of a cylinder as a unit and comprising a packing housing constituted of a cylindrical bushing, means on the exterior of the inner end of the bushing abutting and having sealing engagement with the inner margin of the opening of the end head, the bushing also having an internal annular flange at its inner end, a sleeve-like guide having a flanged end inter-engaged with said internal flange and adapted to provide a guide for a piston rod and also functioning as an abutment for packing, packing housed in the bushing and having one end abutting the flanged end of the sleeve-like guide, a follower engageable with the opposite end of the packing for compressing the same, the outer end of the bushing projecting beyond the end head and readily releasable means co-acting with the projecting end of the bushing and with the end head for securing the bushing assembled with the end head.

2. A self-contained combined stuffing box assembly and guide applicable to and removable from the opening of an end head of a cylinder as a unit and comprising a packing housing in the form of a cylindrical bushing, the inner end of the bushing having an outwardly directed annular rabbeted flange adapted to have sealing engagement with a correspondingly formed seat around the inner margin of the opening of the end head, said bushing having an internal, annular flange at the inner end thereof, a sleeve-like guide having a flanged end inter-engaged with said internal flange and providing a guide for a piston rod projecting inwardly beyond the inner end of said bushing and also providing within said bushing an abutment for packing, packing housed in the bushing and having one end abutting the flanged end of the sleeve-like guide, a follower engageable with the opposite end of the packing and threadedly interconnected with the interior of the bushing, the outer end of the bushing being externally threaded and projecting beyond the end head, an internally threaded collar having free running threaded engagement with the externally threaded end of the bushing so that the collar may be readily turned up on or backed off of the bushing, lock screws threaded through the collar and adapted to bear against the end head to firmly secure the bushing assembled with the end head and lock nuts for securing the lock screws in position whereby by loosening the lock nuts and slightly backing off the lock screws, the collar may be readily spun off the bushing to allow the stuffing box to be assembled with and disassembled from the end head without dismantling the packing or disturbing its adjustment.

EVERETT C. READ.

REFERENCES CITED

The following references are of record in the file of this patent:

UNITED STATES PATENTS

| Number | Name | Date |
|---|---|---|
| 461,640 | Misic et al. | Oct. 20, 1891 |
| 750,486 | Penfold | Jan. 26, 1904 |
| 785,336 | Storle | Mar. 21, 1905 |
| 1,960,927 | Siegert | May 29, 1934 |
| 604,109 | Chrichton | May 17, 1898 |
| 2,300,747 | Read | Nov. 3, 1942 |
| 1,776,895 | Ferguson | Sept. 30, 1930 |
| 1,866,292 | Carlson | July 5, 1932 |
| 1,927,507 | Sommers et al. | Sept. 19, 1933 |
| 2,326,268 | Walter | Aug. 10, 1943 |
| 293,189 | Monroe | Feb. 5, 1884 |
| 1,155,401 | Bodinson | Oct. 5, 1915 |
| 545,761 | Barker | Sept. 3, 1895 |
| 2,204,374 | Metzgar | June 1, 1940 |

FOREIGN PATENTS

| Number | Country | Date |
|---|---|---|
| 15,898 | Great Britain | 1888 |
| 498,839 | Great Britain | July 15, 1937 |